June 8, 1965  P. KOELLER  3,188,050
SEALS FOR TURBO-MACHINERY

Filed June 19, 1963  2 Sheets-Sheet 1

INVENTOR.
PAUL KOELLER
BY R.Q.Eckersley
PATENT AGENT

June 8, 1965 P. KOELLER 3,188,050
SEALS FOR TURBO-MACHINERY

Filed June 19, 1963 2 Sheets-Sheet 2

INVENTOR.
PAUL KOELLER
BY R. A. Eckersley
PATENT AGENT

United States Patent Office 3,188,050
Patented June 8, 1965

3,188,050
SEALS FOR TURBO-MACHINERY
Paul Koeller, Dorval, Quebec, Canada, assignor to
Dominion Engineering Works, Limited
Filed June 19, 1963, Ser. No. 289,042
7 Claims. (Cl. 253—26)

In a mixed flow pump, Francis turbine or other hydraulic turbo-machine having a shrouded rotor, seals are provided for the prevention of excessive leakage of the working fluid past the rotor, from the high to the low pressure side.

Contemporary practice is to allow some fluid to flow from the main working stream, as for example at the periphery of the rotor, where there may be a large velocity energy. However, only the static pressure energy of that fluid causes the flow through the seals. The velocity energy is lost within the sealing passages, and the overall efficiency of the turbomachine is reduced, by both the velocity and the potential energy that the leakage fluid had on the high pressure side of the seal.

I have now invented a method for preventing waste of the velocity energy of that part of the main stream of working fluid which flows through the rotor seals of the turbomachine.

Without deviation from the spirit or scope of this invention, the fluid entering the seals may be tapped from any point or points in the working fluid system. If it is tapped at a point where the total energy is greater than that required for its passage through the seals, the superfluous energy is converted into useful power. If it is tapped from a point where the total energy is less than that required for its injection into the seals, the energy deficiency is made good.

It is also within the spirit of the invention to tap some fluid at a point of high total energy but at lower mass flow than the sealing fluid mass flow requirement, and to use the superfluous total energy of this tapped fluid to raise the pressure of fluid tapped from a point of low total energy, and to use the sum mass flows, at a common energy level, to make up the total sealing fluid supply.

This invention is primarily intended for application in high head Francis turbines or other hydraulic turbo-machines, but it is to be understood that its use is not so limited.

Referring to the drawings.

Figure 1:
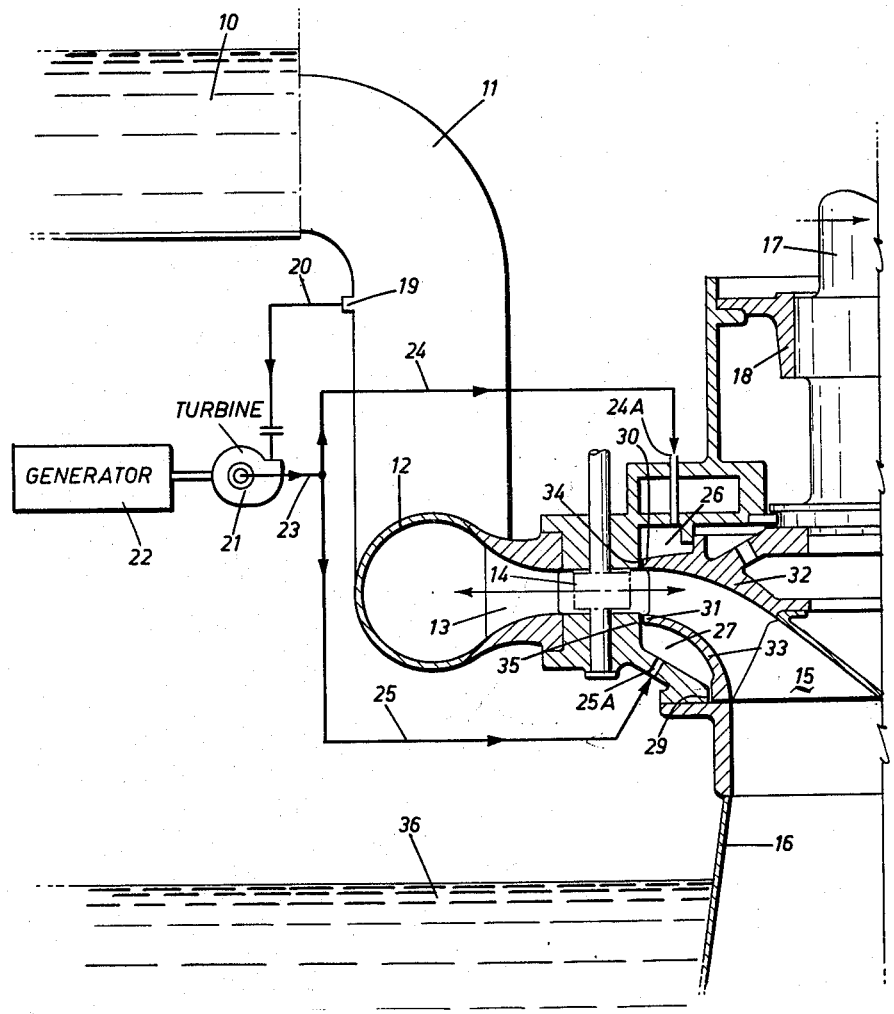
FIG. 1 is a vertical radial section of a Francis type turbine or pump-turbine which illustrates one embodiment of the invention.

Referring more particularly to the drawings wherein similar reference characters designate corresponding parts throughout, the working fluid in this instance water, from headpond 10 flows through penstock 11 to spiral casing 12 and is directed by stay vanes 13 and wicket gates 14 to the rotor shown generally at 15. The water is then discharged by way of draft tube 16. Rotor 15 is attached to shaft 17; shaft 17 is journalled in bearing 18. It will be understood that when this machine operates as a pump, runner 15 and shaft 17 are rotated by external power applied to shaft 17 and the water flow is in the reverse direction.

With reference to FIG. 1, and in particular to that part of the figure which, beginning at reference character 19, schematically illustrates in solid black lines the hydraulic circuit of one form of the invention, water of high total energy is tapped from penstock 11 at a suitable point 19 and is directed by conduit 20 to an auxiliary hydraulic turbine 21 coupled to electric generator 22. The excess energy of the water is converted into mechanical power in turbine 21 and this power is then converted into electrical energy by means of generator 22 and this electrical energy is fed into the power mains.

The water discharged from turbine 21 by way of conduit 23 has enough residual energy for sealing the runner and it is directed by conduits 24 and 25 to upper (26) and lower (27) annular spaces adjacent to rotor 15 by means of upper manifold 24A and lower manifold 25A, whereby leakage of the working fluid into spaces 26 and 27 at the peripheries 30 and 31 of the upper (32) and lower (33) rotor shrouds is prevented.

Figure 2:
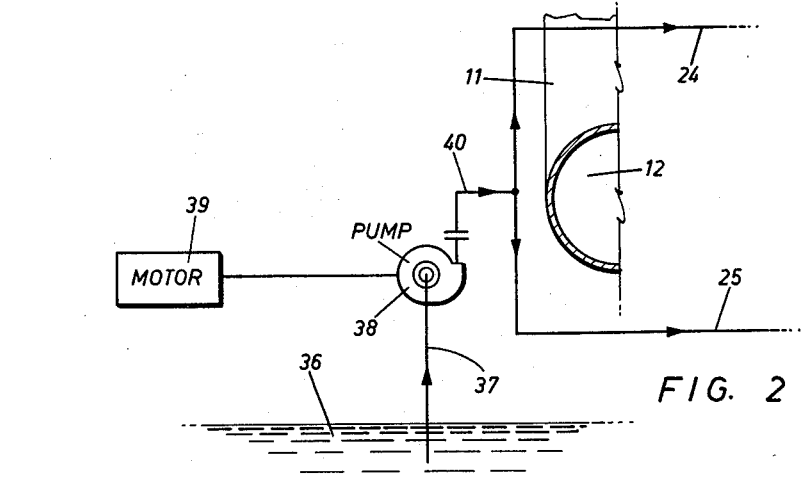
FIG. 2 illustrates a modification to FIG. 1 in which the only portion of the turbine shown is the penstock and spiral casing.

Another form of the invention is illustrated in FIG. 2. In this execution the water for the rotor seals is raised from the tailwater level 36 through conduit 37 by means of pump 38 driven by electric motor 39, to conduit 40 and thence to the rotor seals as described above.

It will be seen that this alternative execution utilizes tailwater 36 where the total energy available is less than that required for its injection into the seals, therefore, this energy deficiency is made good by means of pump 38.

Figure 3:
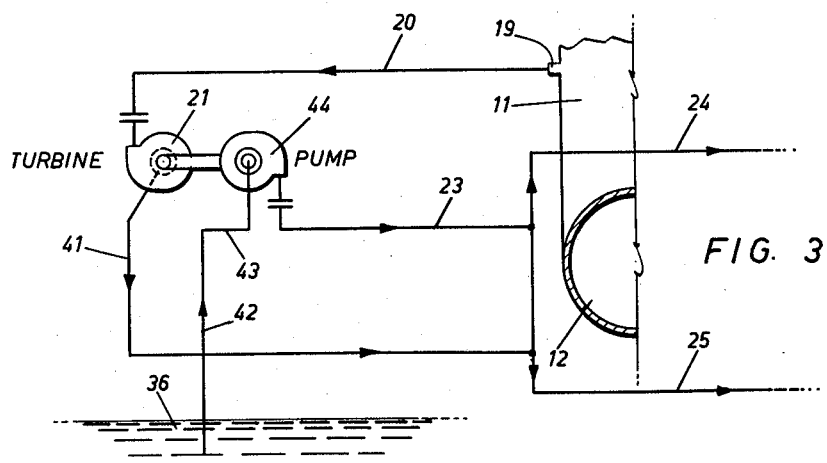
FIG. 3 illustrates a further modification to FIG. 1 in which the only portion of the turbine shown is the penstock and spiral casing.

Referring now to FIG. 3, the hydraulic circuit of another alternative execution of the invention, water of high total energy but at a lower mass flow than that necessary to satisfy seal leakage is tapped from penstock 11 at a suitable location 19, where it is ducted by way of conduit 20 to auxiliary turbine 21. The superfluous energy of the water flowing through turbine 21 is utilized to drive a suitable pump 44 to which turbine 21 is coupled.

The water discharged from auxiliary turbine 21 by way of duct 41 is at the energy level required for its passage through the seals of main turbine runner 15, but the mass flow of water through auxiliary turbine 21 is less than that required to satisfy seal leakage.

Pump 44 lifts low energy water from tailrace 36 by way of ducts 42, 43 and raises its energy to the same level as that of the water discharged from turbine 21 through duct 41. The mass flows of water discharged from turbine 21 and pump 44 together meet the mass flow requirement of seal water for runner 15 of the main turbine.

Figure 4:
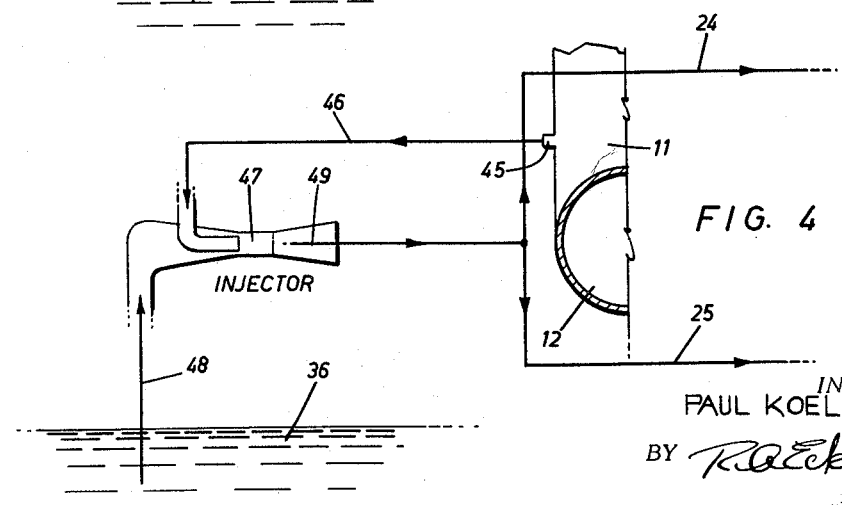
FIG. 4 illustrates still another modification to FIG. 1 in which the only portion of the turbine shown is the penstock and spiral casing.

With reference to the schematic hydraulic circuit shown in FIG. 4 which illustrates a further execution of this invention, water of high total energy but of low mass flow is tapped from penstock 11 at a suitable point 45 and flows by way of conduit 46 to an injector 47. Part of the energy of this water is utilized to raise water of low energy from tailwater 36 by means of conduit 48. At injector discharge 49, the two streams of water, one at reduced energy the other at raised energy, are united at the same energy level, which is that required for the rotor seals, and the combined flows meet the mass flow requirements.

It has been pointed out in connection with FIGURE 1 that the water discharged from turbine 21 into spaces 26 and 27 has enough residual energy to seal the runner against the leakage of working fluid into these spaces. The liquid discharged from turbine 21 is kept at an energy level high enough that liquid flows out of passages 26 and 27, and never into them. Since the pressures of the working fluid in the region of the seals remains in substantially the same relationship whether the machine is operated as a turbine or as a pump, the

I claim:

1. In a hydraulic system, a working fluid having a zone of relatively high total energy and a zone of relatively low total energy, a turbomachine located between said zones comprising a stationary housing, a shrouded rotor in communication with the working fluid and spaced from the stationary housing to form a pair of running clearances, means to prevent leakage of working fluid into at least one of said clearances comprising means for removing a portion of the working fluid from the higher energy zone, means for converting some of the energy from said portion of working fluid into useful work, the amount of energy converted into useful work being substantially equal to the velocity energy of the working fluid at point of entry to said rotor, and means for returning said portion of working fluid to the hydraulic system at said clearance.

2. A hydraulic system as in claim 1, in which the means for converting into useful work the energy from the portion of working fluid is a hydraulic motor driving an electrical generator.

3. In a hydraulic system, a working fluid having a zone of relatively high total energy and a zone of relatively low total energy, a turbomachine located between said zones comprising a stationary housing, a shrouded rotor in communication with the working fluid and spaced from the stationary housing to form a pair of running clearances, means to prevent the leakage of working fluid into at least one of said clearances comprising means for removing a portion of the working fluid from the lower energy zone, means for adding sufficient energy to the said portion of working fluid, such that its total energy is less than the total energy of the working fluid at point of entry to said rotor by an amount substantially equal to the velocity energy of the working fluid at said point of entry, and means for returning said portion of the working fluid to the hydraulic system at said clearance.

4. A hydraulic system as in claim 3 in which the means for adding energy to the portion of working fluid is a pump driven by a prime mover to which power is supplied from a source separate from the hydraulic system.

5. In a hydraulic system, a working fluid having a zone of relatively high total energy and a zone of relatively low total energy, a turbomachine located between said zones comprising a stationary housing, a shrouded rotor in communication with the working fluid and spaced from the stationary housing to form a pair of running clearances, means to prevent the leakage of working fluid into at least one of said clearances comprising means for removing a portion of the working fluid from the high energy zone, means for removing a portion of the working fluid from the low energy zone, means for removing part of the energy from the portion of high energy working fluid, means for adding the energy so removed to the low energy portion of the working fluid, the amount of energy transferred from the high energy portion of working fluid to the low energy portion of the working fluid being such that the total energy of each portion is substantially equal to the total energy of the working fluid at point of entry to the rotor less the velocity energy of the working fluid at said point of entry, and means for returning both portions of the working fluid to the hydraulic system at said clearance.

6. A hydraulic system as in claim 5 in which the means for removing part of the energy from the portion of high energy fluid is a hydraulic motor, and the means for adding the energy so removed to the low energy portion of working fluid is a pump driven by said hydraulic motor.

7. A hydraulic system as in claim 5 in which the transfer of energy from the high energy portion of working fluid to the low energy portion of working fluid takes place in an injector.

References Cited by the Examiner

UNITED STATES PATENTS 2,656,096  10/53  Schwarz _____ 230—122

FOREIGN PATENTS 714,290  11/46  Germany.
489,082  1/54  Italy.

KARL J. ALBRECHT, *Primary Examiner.*

JOSEPH H. BRANSON, JR., *Examiner.*